(12) United States Patent
Jung et al.

(10) Patent No.: US 7,753,539 B2
(45) Date of Patent: Jul. 13, 2010

(54) BACKLIGHT ASSEMBLY AND LIQUID CRYSTAL DISPLAY DEVICE HAVING THE SAME

(75) Inventors: Kyu Bong Jung, Gangwon-do (KR); Jae Won Shin, Busan-si (KR); Jun Hyung Kim, Jeollanam-do (KR); Jin Woo Hong, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 54 days.

(21) Appl. No.: 11/642,874

(22) Filed: Dec. 21, 2006

(65) Prior Publication Data

US 2008/0002387 A1    Jan. 3, 2008

(30) Foreign Application Priority Data

Jun. 30, 2006    (KR) .................... 10-2006-0060080

(51) Int. Cl.
G01D 11/28    (2006.01)
(52) U.S. Cl. .................. 362/29; 362/614; 362/611; 362/613; 362/632; 362/633
(58) Field of Classification Search .................. 362/29, 362/614, 611, 613, 632, 633
See application file for complete search history.

(56) References Cited

U.S. PATENT DOCUMENTS

| | | | |
|---|---|---|---|
| 2004/0156183 A1* | 8/2004 | Kim | 362/31 |
| 2005/0073858 A1* | 4/2005 | Kim et al. | 362/561 |
| 2005/0146895 A1* | 7/2005 | Hsieh | 362/613 |
| 2005/0265047 A1* | 12/2005 | Yun et al. | 362/611 |
| 2006/0215386 A1* | 9/2006 | Hatanaka et al. | 362/29 |
| 2006/0291190 A1* | 12/2006 | Tsai | 362/97 |
| 2007/0030663 A1* | 2/2007 | Ryu | 362/29 |

* cited by examiner

Primary Examiner—Sandra L O'Shea
Assistant Examiner—Jessica L McMillan
(74) Attorney, Agent, or Firm—Morgan Lewis & Bockius LLP

(57) ABSTRACT

A backlight assembly includes a plurality of lamps each having electrodes at opposite ends of a tube, and a bottom cover for receiving the plurality of lamps, the bottom cover having a bottom surface, first lateral sides that correspond to the ends of the plurality of lamps, and second lateral sides that correspond to a lengthwise direction of the plurality of lamps, wherein the first lateral sides have a first height above the bottom surface of the bottom cover that is less than a second height of the second lateral sides above the bottom surface of the bottom cover.

12 Claims, 3 Drawing Sheets

BACKLIGHT ASSEMBLY AND LIQUID CRYSTAL DISPLAY DEVICE HAVING THE SAME

This invention claims the benefit of Korean Patent Application No. 60080/2006 filed in Korea on Jun. 30, 2006, which is hereby incorporated by reference in its entirety.

BACKGROUND OF THE INVENTION

1. Field of the Invention

Embodiments of the invention relate to a backlight assembly, and more particularly, to a backlight assembly and a liquid crystal display (LCD) device having the same. Although embodiments of the invention are suitable for a wide scope of applications, it is particularly suitable for improving display quality.

2. Description of the Related Art

In general, the applications of LCD devices are gradually expanding due to its characteristics of lightweight, slim profile, and low power consumption. For example, the LCD is used in office automation apparatus and audio/video apparatus. The LCD device displays a desired image on a screen by controlling light transmittance in response to image signals applied through a plurality of switching devices in a matrix.

Since the LCD device is not a self-emission type display device, the LCD device requires a backlight assembly. The backlight assembly for an LCD device can either be a direct type backlight assembly or an edge type backlight assembly depending on the position of a lamp relative to the liquid crystal panel. The edge type backlight assembly includes a lamp disposed in an outer block along an edge of the liquid crystal panel and provides light to the entire surface of the liquid crystal display panel using a light guide. On the other hand, the direct type backlight assembly includes a lamp disposed directly under a backside of an liquid crystal display panel so as to provide light onto the entire surface of the liquid crystal display panel.

Compared to the edge type backlight assembly, the direct type backlight assembly has the advantages of higher brightness and wider light-emitting area by arranging a plurality of lamps directly under the liquid crystal display panel. As the size of the LCD device increases, the size of the backlight assembly for illuminating the LCD device also increases. Consequently, most of the LCD devices use the direct type backlight assembly.

A bottom cover contains a plurality of lamps. The bottom cover has a box shape with an opening for receiving the plurality of lamps. A metal having high strength is used to form the bottom cover. Therefore, a parasitic capacitor can be generated by an electrical phenomenon between the bottom cover and the plurality of lamps. A leakage current is generated by the parasitic capacitor, which reduces the brightness of the plurality of lamps. Therefore, brightness of a related art LCD device can be reduced by the parasitic capacitor between the bottom cover and the plurality of lamps such that the display quality is reduced.

SUMMARY OF THE INVENTION

Accordingly, embodiments of the invention are directed to a backlight assembly and a liquid crystal display (LCD) device having the same that substantially obviate one or more problems due to limitations and disadvantages of the related art.

An object of embodiments of the invention is to provide a backlight assembly for reducing a leakage current between a bottom cover and the lamps.

Another object of embodiments of the invention is to provide a liquid crystal display device is to improve display quality by preventing a reduction in the brightness of the lamps within a backlight assembly.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these objects and other advantages and in accordance with the purpose of the invention, as embodied and broadly described herein, a backlight assembly includes a plurality of lamps each having electrodes at opposite ends of a tube, and a bottom cover for receiving the plurality of lamps, the bottom cover having a bottom surface, first lateral sides that correspond to the ends of the plurality of lamps, and second lateral sides that correspond to a lengthwise direction of the plurality of lamps, wherein the first lateral sides have a first height above the bottom surface of the bottom cover that is less than a second height of the second lateral sides above the bottom surface of the bottom cover.

In another aspect, there is provided backlight assembly includes a plurality of lamps each having electrodes at opposite ends of a tube, a bottom cover for receiving the plurality of lamps, the bottom cover having a bottom surface, first lateral sides that correspond to the ends of the plurality of lamps and have a first height above the bottom surface of the bottom cover, and second lateral sides that correspond to a lengthwise direction of the plurality of lamps and have a second height above the bottom surface of the bottom cover, and lamp holders that are at both ends of the plurality of lamps and have a third height above the bottom surface of the bottom cover, wherein the third height of the lamp holders is greater than the first height of the first lateral sides and each of the plurality of lamps has a centerline positioned above the first height of the first lateral sides.

In yet another aspect, a liquid crystal display device includes a plurality of lamps each having electrodes at opposite ends of a tube, a bottom cover for receiving the plurality of lamps, the bottom cover having a bottom surface, first lateral sides that correspond to the ends of the plurality of lamps, and second lateral sides that correspond to a lengthwise direction of the plurality of lamps, a liquid crystal display panel for displaying an image using light emitted from the lamps, wherein the first lateral sides have a first height above the bottom surface of the bottom cover that is less than a second height of the second lateral sides above the bottom surface of the bottom cover.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
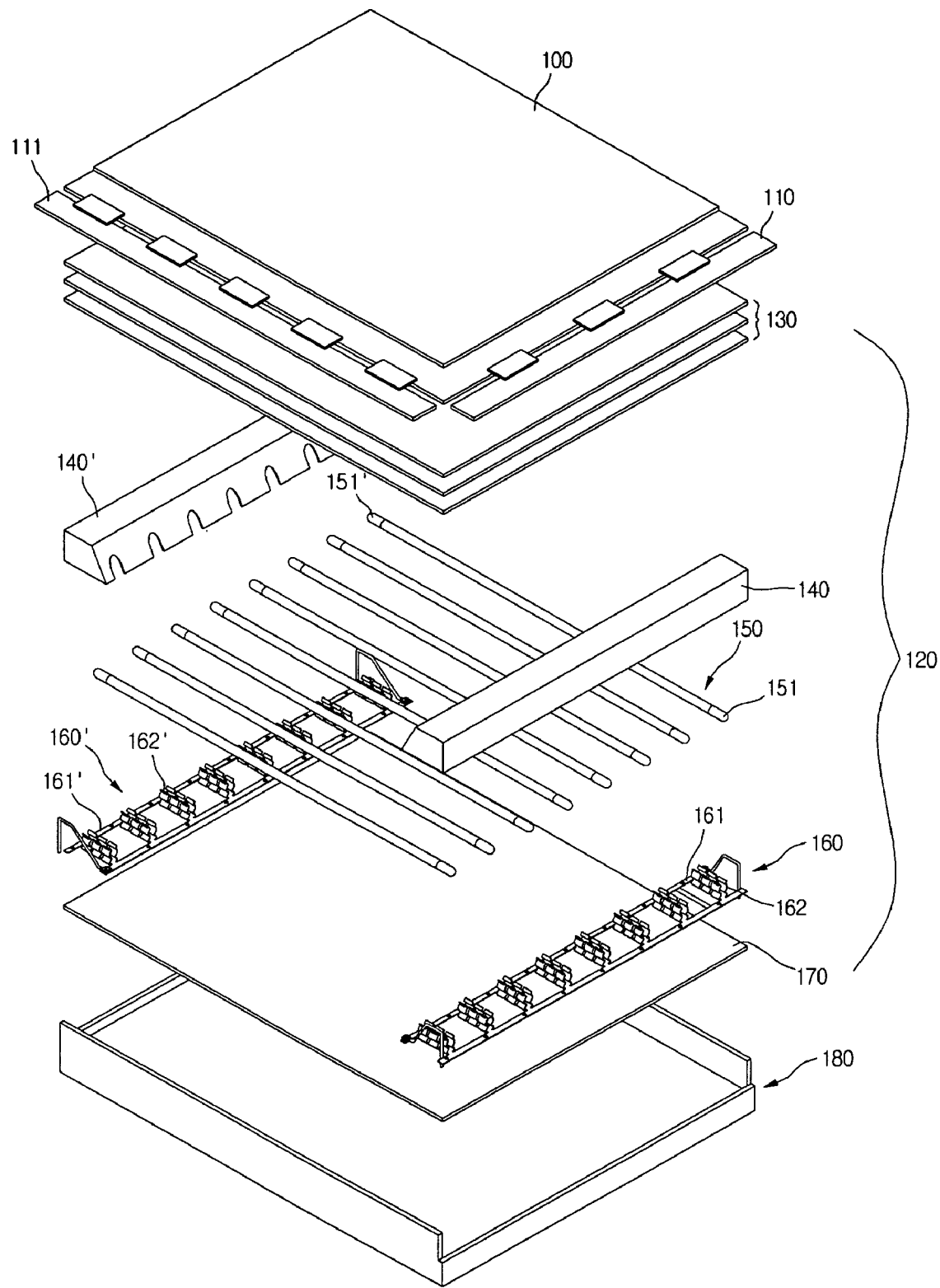
FIG. 1 is an exploded perspective view of a direct type LCD device according to an embodiment of the invention.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 2:
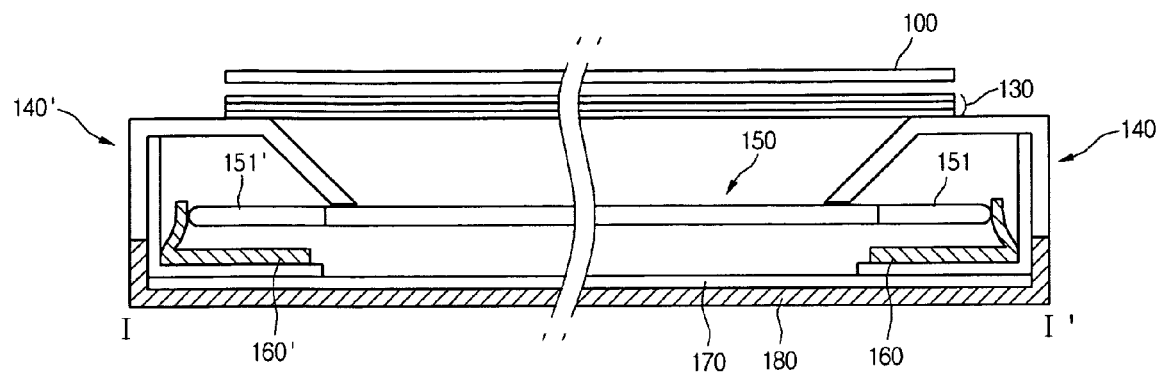
FIG. 2 is a cross-sectional view illustrating the assembled LCD device of FIG. 1.
Figure 3:
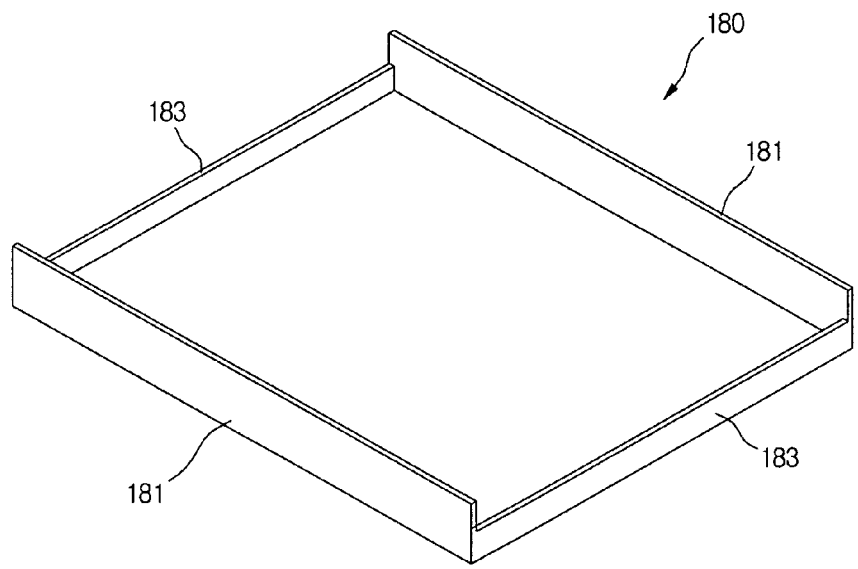
FIG. 3 is a perspective view illustrating the bottom cover of FIG. 1.

FIG. 1 is an exploded perspective view of a direct type LCD device according to an embodiment of the invention, FIG. 2 is a cross-sectional view illustrating the assembled LCD device of FIG. 1, and FIG. 3 is a perspective view illustrating the bottom cover of FIG. 1. Referring to FIGS. 1 to 3, the direct type LCD device includes a liquid crystal display panel 100 for displaying an image, gate/data line driving substrates 110 and 111 for driving the liquid crystal display panel 100, and a backlight assembly 120 for providing light onto the LC display panel 100. The liquid crystal display panel 100 includes a thin film transistor (TFT) array substrate and a color filter substrate facing and attached to each other such that a uniform cell gap is formed therebetween, and a liquid crystal layer interposed between the TFT array substrate and the color filter substrate. The backlight assembly 120 includes a bottom cover 180, a reflector 170 disposed on the bottom cover 180, a plurality of lamps 150 disposed on the reflector 170 at a predetermined interval, a first lamp holder 160 and a second lamp holder 160' for affixing both ends of the lamps 150, a first supporter side 140 and a second supporter side 140' for protecting both ends of the lamps 150, and the first and second lamp holders 160 and 160', and optical sheets 130 seated on the first and second supporter sides 140 and 140' to diffuse and condense light.

The lamp 150 includes a first external electrode 151 and a second external electrode 151' formed on both ends of the lamp 150, respectively. The lamp 150 can be an external electrode fluorescent lamp (EEFL) having first and second external electrodes 151 and 151'. Although an EEFL is described in this embodiment of the invention, other embodiments can use a cold cathode fluorescent lamp (CCFL). Although the lamp 150 is not illustrated in detail, a fluorescent material is coated on an inner wall surface of the glass tube and then a discharge gas is injected into a glass tube. The lamp 150 emits light in response to a driving voltage using the first and second external electrodes 151 and 151' formed at both ends of the glass tube.

The first and second lamp holders 160 and 160' include a first affixing plate 161 and a second affixing plate 161', and a first clip portion 162 and a second clip portion 162' protruding from the first and second affixing plates 161 and 161' to affix the lamp 150. The first and second clip portions 162 and 162' affix to the first and second external electrodes 151 and 151' by receiving the first and second external electrodes 151 and 151'. The first and second affixing plates 161 and 161' are connected to the first and second clip portions 162 and 162' so as to apply a driving voltage from the outside to the first and second external electrodes 151 and 151' of the lamp 150.

The first and second supporter sides 140 and 140' are disposed to surround the first and second external electrodes 151 and 151' of the lamp 150. Optical sheets 130, which are supported by the first and second supporter sides 140 and 140', can be disposed over the lamp 150. The first and second supporter sides 140 and 140' can be generally formed of a poly carbonate-based insulating material.

The optical sheets 130 include a diffuser sheet for diffusing light, a prism sheet for condensing light, and a protector sheet for protecting the prism sheet. The diffuser sheet can be a flat type or a wedge type that is manufactured from a resin, glass or plastic, such as polymethylacrylate. The diffuser sheet is disposed on the first and second supporter sides 140 and 140' so as to support the prism sheet and the protector sheet.

The reflector 170 is disposed below the lamps 150 to reflect light propagating downward from the lamps 150 toward the optical sheets 130. The bottom cover 180 is formed of metal and has a box shape whose upper surface is open. The bottom cover 180 is formed in the metal box shape to increase the structural integrity of the LCD device, which has a slim profile. Both sides of the bottom cover 180 that correspond to both ends of the lamps 150 have lower heights above a bottom surface of the bottom cover than the other sides corresponding to a lengthwise direction of the lamps 150. The both sides of the bottom cover 180 that correspond to the ends of the lamps 150 will hereinafter be defined as first lateral sides 183, and the other sides of the bottom cover 180 that correspond to the lengthwise direction of the lamps 150 will hereinafter be defined as second lateral sides 181.

Heights of the first lateral sides 183 above the bottom surface of the bottom cover 180 are lower than those of the second lateral sides 181, and are also than the height of the lamps 150 above the bottom surface of the bottom cover 180. Further, the heights of the first lateral sides 183 above the bottom surface of the bottom cover 180 are lower than those of the first and second lamp holders 160 and 160'. The first lateral sides 183 being lower than the positions at which the lamps 150 are disposed reduces parasitic capacitance between the lamps 150 and the metal bottom cover 180.

Light emitted from the lamps 150 is diffused and condensed while passing through the optical sheets 130, and illuminated onto the liquid crystal display panel 100. The liquid crystal display panel 100 displays a predetermined image using the illuminated light in response to control signals input from the gate/data driving substrates 110 and 111.

In the above-described direct type LCD device according to an embodiment of the invention, first lateral sides of the bottom cover 180 that correspond to the ends of the lamps 150 have a lower height above a bottom surface of the bottom cover 180 than a position at which the lamps 150 are disposed above the bottom surface of the bottom cover 180 to reduce parasitic capacitance generated between the lamps 150 and the metal bottom cover 180, so that brightness reduction of the lamps 150 caused by the parasitic capacitance is prevented. Also, according to an embodiment of the invention, the area of the bottom cover 180 is reduced so that the weight of the LCD device can be reduced.

Figure 4:
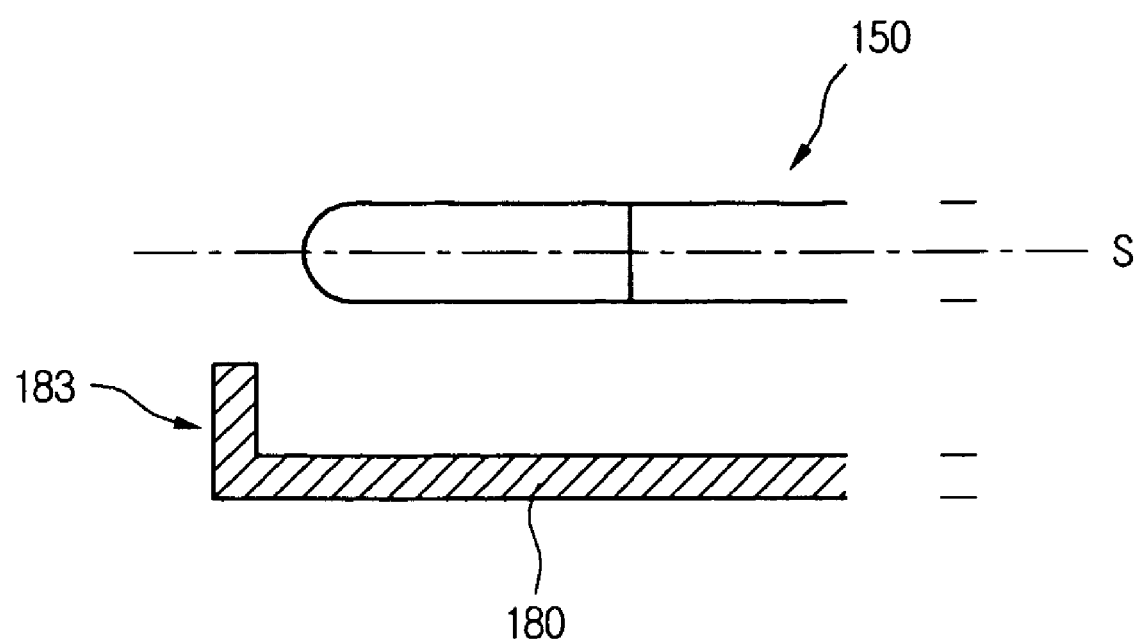
FIG. 4 is a cross-sectional view illustrating a lamp and a bottom cover according to an embodiment of the invention.

FIG. 4 is a cross-sectional view illustrating a lamp and a bottom cover according to an embodiment of the invention. As shown in FIG. 4, the heights of the first lateral sides 183 have an overall height from the bottom surface of the bottom cover 180 that is lower than the centerline S of the lamps 150 above the bottom surface of the bottom cover 180. Therefore, since the first lateral sides 183 of the metal bottom cover 180 are lower in height than the centerline S of the lamps 150 with respect to the bottom surface of the bottom cover 180, an area of capacitance between the lamps 150 and the bottom cover 180 is reduced, so that parasitic capacitance generated between the lamps 150 and the bottom cover 180 can be reduced.

As shown in Equation 1 below, capacitance decrease is proportional to decrease in the area.

$$C = \frac{\varepsilon A}{d} \quad \text{Equation 1}$$

C is capacitance, $\varepsilon$ is dielectric constant, A is an area of a plate, and 'd' is a distance between plates. Therefore, according to embodiments of the invention, the first lateral sides 183 of the bottom cover 180, which correspond to the ends of the lamps 150 are disposed, are formed to be at a lower height above the bottom surface of the bottom cover 180 than the height of the lamps 150 above the bottom surface of the bottom cover 180, so that parasitic capacitance generated between the lamps 150 and the bottom cover 180 is reduced so as to reduce leakage current.

According to embodiments of the invention, heights of both lateral sides of the bottom cover that correspond to the ends of the lamps are formed lower than the positions of the lamps with respect to the bottom surface of the bottom cover so that the area of the bottom cover facing the electrodes of the lamps is reduced, and thus parasitic capacitance that may be generated between the lamps and the bottom cover is reduced. Therefore, embodiments of the invention can prevent a brightness reduction problem of the lamps by modifying the bottom cover in the neighborhood of the lamps to reduce parasitic capacitance generated between the lamps and the bottom cover so as to reduce leakage current. Also, since an area of the bottom cover is reduced, the weight of the LCD device is reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A backlight assembly comprising:
   a plurality of lamps each having electrodes at opposite ends of a tube;
   a bottom cover for receiving the plurality of lamps, the bottom cover having a bottom surface, first lateral sides that correspond to the ends of the plurality of lamps, and second lateral sides that correspond to a lengthwise direction of the plurality of lamps; and
   lamp holders at both ends of the plurality of lamps, wherein the lamp holders have a third height above the bottom surface of the bottom cover that is greater than the first height of the first lateral sides,
   wherein the first lateral sides and the second sides lateral vertically formed with respect to the bottom surface, and the first lateral sides have a first height above the bottom surface of the bottom cover that is less than a second height of the second lateral sides above the bottom surface of the bottom cover to reduce parasitic capacitance between the lamps and the bottom cover,
   wherein the bottom cover has a box shape formed of metal,
   wherein the first height of the first lateral sides is lower than the horizontal centerline of the lamp which parallels a length direction of the lamp and passes through the center of the lamp, and
   wherein the ends of the plurality of lamps is disposed at an inner region of the first lateral sides.

2. The backlight assembly according to claim 1, further comprising optical sheets formed above the plurality of lamps to diffuse and condense light.

3. The backlight assembly according to claim 1, wherein the plurality of lamps are one of external electrode fluorescent lamps and cold cathode fluorescent lamps.

4. The backlight assembly according to claim 1, wherein the first lateral side have a width less than a width of the second lateral side.

5. A backlight assembly comprising:
   a plurality of lamps each having electrodes at opposite ends of a tube;
   a bottom cover for receiving the plurality of lamps, the bottom cover having a bottom surface, first lateral sides that correspond to the ends of the plurality of lamps and have a first height above the bottom surface of the bottom cover, and second lateral sides that correspond to a lengthwise direction of the plurality of lamps and have a second height above the bottom surface of the bottom cover; and
   lamp holders that are at both ends of the plurality of lamps and have a third height above the bottom surface of the bottom cover,
   wherein the third height of the lamp holders is greater than the first height of the first lateral sides and each of the plurality of lamps has a centerline positioned above the first height of the first lateral sides,
   wherein the first lateral sides and the second lateral sides vertically formed with respect to the bottom surface, and the first lateral sides have a first height above the bottom surface of the bottom cover that is less than a second height of the second lateral sides above the bottom surface of the bottom cover to reduce parasitic capacitance between the lamps and the bottom cover,
   wherein the first lateral sides have a first height above the bottom surface of the bottom cover that is less than a second height of the second lateral sides above the bottom surface of the bottom cover,
   wherein the bottom cover has a box shape formed of metal,
   wherein the first height of the first lateral sides is lower than the horizontal centerline of the lamp which parallels a length direction of the lamp and passes through the center of the lamps and
   wherein the ends of the plurality of lamps is disposed at an inner region of the first lateral sides.

6. The backlight assembly according to claim 5, further comprising optical sheets formed above the plurality of lamps to diffuse and condense light.

7. The backlight assembly according to claim 5, wherein the plurality of lamps are one of external electrode fluorescent lamps and cold cathode fluorescent lamps.

8. The backlight assembly according to claim 5, wherein the first lateral side have a width less than a width of the second lateral side.

9. A liquid crystal display device comprising:
   a plurality of lamps each having electrodes at opposite ends of a tube;
   a bottom cover for receiving the plurality of lamps, the bottom cover having a bottom surface, first lateral sides that correspond to the ends of the plurality of lamps, and second lateral sides that correspond to a lengthwise direction of the plurality of lamps;

a liquid crystal display panel for displaying an image using light emitted from the lamps; and lamp holders at both ends of the plurality of lamps, wherein the lamp holders have a third height above the bottom surface of the bottom cover that is greater than the first height of the first lateral sides, wherein the first lateral sides and the second lateral sides vertically formed with respect to the bottom surface, and the first lateral sides have a first height above the bottom surface of the bottom cover that is less than a second height of the second lateral sides above the bottom surface of the bottom cover to reduce parasitic capacitance between the lamps and the bottom cover, wherein the bottom cover has a box shape formed of metal, wherein the first height of the first lateral sides is lower than the horizontal centerline of the lamp which parallels a length direction of the lamp and passes through the center of the lamps and wherein the ends of the plurality of lamps is disposed at an inner region of the first lateral sides.

10. The liquid crystal display device according to claim 9, further comprising optical sheets between the plurality of lamps and the liquid crystal display panel to diffuse and condense light.

11. The liquid crystal display device according to claim 9, wherein the plurality of lamps are one of external electrode fluorescent lamps and cold cathode fluorescent lamps.

12. The liquid crystal display device according to claim 9, wherein the first lateral side have a width less than a width of the second lateral side.

* * * * *